3,277,098
DI-URETHANES AND PROCESSES FOR
THEIR PRODUCTION
Rudolf Merten, Cologne-Flittard, Germany, assignor to Farbenfabriken Bayer Aktiengesellschaft, Leverkusen, Germany, a German corporation
No Drawing. Filed Oct. 5, 1961, Ser. No. 143,044
Claims priority, application Germany, Oct. 7, 1960, F 32,292; Nov. 24, 1960, F 32,611; Apr. 29, 1961, F 33,813; June 21, 1961, F 34,236
28 Claims. (Cl. 260—287)

The present invention relates to and has as its objects new and useful urethanes and a new and useful process for their production by addition and condensation reactions. The new compounds of this invention are valuable intermediates for the production of plastics and resins of known types and distinguish themselves moreover by insecticidal properties which renders them useful in the agriculture field especially for plant protection. The broadest formulae for representation of the new urethanes are the following Formulae A and B:

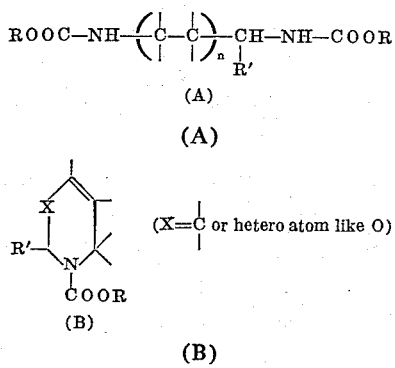

(A)

(B)

R in these formulae stands for optionally substituted alkyl, aryl, aralkyl, alkyl-aryl or cyclo-alkyl radicals; R' stands for hydrogen, a radical as stated before for R or also a heterocyclic radical. The grouping

is a radical of a former olefinic compound and will be explained in more detail in the following description.

The Formula B is a special case of A, namely when the olefinic grouping has been a diene-type-compound. Also this will be shown in more detail in the following description.

The production of mono- or polyurethanes by different methods, for example, by the reaction of amines with chlorocarbonic acid esters or by the addition of alcohols to isocyanates, is known.

The object of the present invention is a new process for the production of mono- or polyurethanes by the condensation of olefines with alkylidene urethanes or condensation products from carbamic acid esters and broadly aldehydes in the presence of acidic catalysts.

It has also been found that basically substituted components, particularly also basic aldehydes or basic alkylidene-urethanes, can also be employed within the scope of this process, when these are brought to reaction in the form of their salts with regard to the basic grouping. Surprisingly and despite the minimal solubility of these salts in the employed media, reaction with the olefinic components takes place within a short time.

It has furthermore been found that the above described condensation or addition reaction described there is not limited to cationically polymerisable olefines, but that it can be carried out quite generally with all those unsaturated systems which react during a Diels-Alder re-action in the form of the diene component. The present invention therefore also relates to a process for the production of addition products from (a) alkylideneurethanes or condensation products of aldehydes and carbamic acid esters prepared by means of acidic catalysts and (b) olefinic unsaturated components which are capable of reacting during a diene synthesis, in the presence of acidic catalysts.

As carbamic acid esters in the meaning of the present invention there may be mentioned any desired esters of unsubstituted carbamic acid of the general formula $H_2N$—COO—R, R being any desired organic residue of aliphatic, cycloaliphatic, araliphatic or aromatic nature, which can also be substituted, for example, carbamic acid methyl ester, ethyl ester, propyl ester, butyl ester, isobutyl ester, hexyl ester, allyl ester, crotyl ester, benzyl ester, furfuryl ester, $\beta$-chloroethyl ester, etc., whereby polyfunctional alcohols, such as ethylene glycol, diethylene glycol, polyethylene glycols, propylene glycols, butanediols, 1,6-hexanediol, hydroxyethylated hydroquinone, quinite (cyclohexanediol), glycerol or trimethylolalkanes, can be substituted wholly or partially for the production of the carbamic acid esters, for example, via a reaction of urea with the corresponding alcohol, a reaction of the corresponding chlorocarbonic acid ester with ammonia or by partial ammonolysis of a corresponding carbonic acid diester with ammonia.

As suitable aldehydes for the present process there come into question any desired mono- or polyfunctional and also, possibly substituted, aliphatic, cycloaliphatic, or aromatic types of which, by way of example, there may be mentioned: formaldehyde, acetaldehyde, chloroacetaldehyde, trichloroacetaldehyde, propionaldehyde, butyraldehyde, isobutyraldehyde, oenanthaldehyde, stearyl aldehyde, glyoxal, benzaldehyde, alkyl-substituted benzaldehydes, methoxy-benzaldehydes, halogenated benzaldehydes, nitrobenzaldehydes, hexahydrobenzaldehydes, terephthaldehyde, naphthaldehyde, phenyl-acetaldehyde, furfural, acrolein, crotonaldehyde, cinnamyl aldehyde.

Basically substituted aldehydes within the meaning of the present invention are represented by those types which exhibit basic nitrogen atoms of a tertiary nature. As example there may be mentioned as aliphatic aldehydes dimethylamino-acetaldehyde, diethylamino-acetaldehyde, 3-diethylamino-propionaldehyde, and also aromatic and cycloaliphatic aldehydes, such as dialkylamino-benzaldehydes and their substitution and/or hydrogenation products, such as p-dimethylamino-benzaldehyde, o-diethylamino - benzaldehyde, m - dimethylamino - benzaldehyde, 4 - dimethylaminohexahydrobenzaldehyde, 4-diethylamino-2-methyl-benzaldehyde; in addition, there can also be considered heterocyclic aldehydes, such as e.g. pyridine-2-carboxaldehyde, pyridine-3-carboxaldehyde, pyridine-4-carboxaldehyde, which are also known as picolinaldehyde, nicotinaldehyde, and isonicotinaldehyde, respectively, as well as their alkyl, halogeno, nitro, and alkoxy substitution products, such as 4-methylpyridine - 2 - carboxaldehyde, 4 - chloro - pyridine - 3 - carboxaldehyde, 2 - ethoxy - pyridine - 4 - carboxaldehyde, 4,6 - dimethyl - pyridine - 2 - carboxaldehyde, and also quinolinecarboxaldehydes, isoquinolinecarboxaldehydes, or N-alkyl-indolecarboxaldehydes.

In addition it is also possible to employ the above mentioned basically substituted aldehydes in combination with any desired mono- or poly-functional non-basic, optionally substituted, aliphatic, cycloaliphatic, or aromatic aldehydes, as are described above.

As olefines in the meaning of the present invention there can be used any desired representative of this class which is capable of a cationic polymerization. As examples herefor there may be mentioned: straight chain or branched aliphatic olefines with 2–18 carbon atoms, such as ethylene, propylene, butylene, isobutylene, di-isobutylene or tri-isobutylene, cycloaliphatic types, such as vinyl-cyclohexane, aromatic substituted olefines, such as styrene, nuclear or side-chain halogenated styrenes, nuclear or side-chain alkylated styrenes, such as for example methyl-styrene, ethyl styrene, as well as poly-olefines, such as butadiene, isoprene, 2,3-dimethyl-butadiene, pentadiene, vinyl-cyclohexene or divinyl-benzene.

In a broader sense use can be made as olefines within the scope of the present process of all those compounds which can be employed as dienes during a diene synthesis. Descriptions and lists of such compounds are in the chapter entitled "The Diene Synthesis" that was written by K. Alder and translated and revised by C. V. Wilson and J. A. VanAllan, on pages 381 to 511 of the book "Newer Methods of Preparative Organic Chemistry," published 1948 by Interscience Publishers, Inc., New York, and the article by James A. Norton, entitled "The Diels-Alder Diene Synthesis" that was published in Chemical Reviews, vol. 31, pages 319 to 523 (1942). Among the large number of the compounds there specified and also of those compounds described subsequently as reacting as dienes, there may be mentioned for example: diene hydrocarbons with a 1,3-diene structure, as long as they are not already covered by the scope mentioned above owing to their polymerisability with cationic initiators, such as α-phellandrene (5-isopropyl-2-methyl-1,3-cyclohexadiene), bi-1-cyclohexen-1-yl

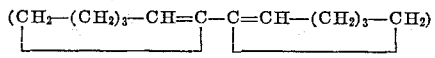

1,1'-bicyclopentenyl, 1,1'-bicyclobutenyl, 1-isopropyl-cyclohexene, 1-isobutenyl-cyclohexene as well as their benzo-derivatives which may be prepared by the process described by V. R. Skvarchenko, Wên-Lian Ling, and R. Ya. Levina, in Zhur. Obschei Khim, vol. 30, pages 2141–2145 (1960), an English translation of which is available as vol. 30, part IV of the Journal of General Chemistry (U.S.S.R.), pages 2117–2120, and an abstract of which is published in Chemical Abstracts, vol. 55, column 10403d, involving a pinacoline reduction of ketones with aluminum amalgam and subsequent dehydration, 1,2-dimethylene-cycloalkanes as well as their endo-substituted and/or halogenated derivatives, e.g. in accordance with British Patents Nos. 796,133 and 796,135, bearing the names of John B. Rose and Anthony H. Willbourn, and the article by M. A. P. Bowe, R. G. J. Miller, J. B. Rose, and D. G. M. Wood, in Jour. Chem. Soc. (London), 1960, pages 1541–1547, and German Patent No. 1,090,204, bearing the names of Klaus J. Fust and H. H. Friederich. In addition, consideration can also be given to cyclic dienes, such as furans, alkylfurans, cyclopentadieneones, α,α',β,β'-benzo-furan. The diene system may also contain a heteroatom as a component as is the case, e.g., in acrolein, vinyl methyl ketone, o-methylene-cyclohexanone, o-quinone-methidene, 2,2'-bis-3-indolonyl (dehydro-indigo), and others. A further group of systems reacting as dienes is derived from the class of polycyclic systems which are capable of being converted into higher conjugated systems, usually of an aromatic nature, during the addition reaction. Mention may be made, for example, anthracene, alkyl and/or aryl substituted anthracenes, 2,3-benzanthracene, pentacene, methylcholanthrene, naphtho-2',3',3,4-pyrene, 1,9,5,10-(perinaphthylene)-anthracene, 7,7'-dimethyl-(naphtho-2',3',1,2-anthracene), and others, also thebaine, dihydropyridines, as well as natural compounds such as derivatives of abietic acid, ergosterol etc.

All these olefines preferably contain stabilizing agents against a radical polymerization, such as, for example, hydroquinone, phenothiazine and the like.

In accordance with modifications to the process of the present invention, it is also possible that the other components for this process are of a basic character. Thus, it is possible to employ basic carbamic acid esters, such as, for instance, those which derive from tertiary amino alcohols; in addition, it is also possible to employ basically substituted olefines, such as, e.g., vinyl-pyridines, alkylvinyl-pyridines, vinyl-quinolines, and similar compounds, by themselves, or when mixed with non-basic components, but in the form of their salts.

The alkylidene diurethanes required for the carrying out of the process according to the invention are produced in known manner (see Houben-Weyl, "Methoden der organischen Chemie," published by Thieme-Verlag, Stuttgart, Germany, vol. 7/1 (1954), p. 481; vol. 8 (1952), p. 147) by the condensation of two mol of carbamic acid ester with one mol of a suitable aldehyde in the presence of acidic catalysts. As acidic catalysts there come into consideration not only those which are mentioned in the following for the condensation with olefines but also any other desired acidic substances, i.e. substances which in aqueous solution show a pH value below 7, such as, for example, boric acid, acetic acid, hydrochloric acid and the like.

Furthermore, condensation products can also be used for the present process which are obtained by the condensation under other molar ratios of the components, i.e. especially ratios between 1:1 to 1:2 for aldehyde to carbamic acid ester. These condensations can be placed immediately before the following reaction.

In the latter case, the removal of the water formed is carried out, for example, by simple distillation or, preferably, by azeotropic distillation, for example, with the help of a solvent, such as aliphatic hydrocarbons, cyclohexane or aromatics etc.

Of course, alkylidene diurethanes produced in other ways can also be used for the carrying out of the present invention.

The reaction of the alkylidene urethanes with the olefines is carried out in the presence of acidic catalysts, such as are known for the carrying out Friedel-Crafts reactions. As examples there are to be mentioned: phosphoric acid, perchloric acid, hydrogen halides, fluorosulfonic acid, chlorosulfonic acid, trichloro-acetic acid, methane-sulfonic-acid, toluene-sulfonic acid, technical sulfonic acid mixtures of aliphatic or aromatic nature, such as, for example, the mixture obtained by sulfonation of long-chain saturated aliphatic hydrocarbons containing from 10 to 18 carbon atoms, sulfonated polymers based on polystyrene optionally cross-linked with polyvinyl compounds, etc. or phenol-formaldehyde condensation products; furthermore, metallic or non-metallic halides functioning as Lewis acids, such as boron trifluoride and its adducts with ether, acetic acid, etc., boron trichloride, phosphorus halides, phosphorus oxyhalides, aluminum chloride, zinc chloride, stannic chloride, ferric chloride, antimonic chloride, chromic chloride and the like, such as are described beginning at page 115 of the book "Mechanism and Structure in Organic Chemistry" by Edwin Sheldon Gould published 1959 by Henry Holt & Co., Inc., New York.

The proportions used in the reaction of the olefines with the possibly intermediately formed alkylidene urethanes are widely variable. In the case of using equimolar amounts of alkylidene urethane and olefine, 1:1 adducts can be obtained, by the use of excess olefine, however, also adducts with higher proportions of olefine, while the use of excess alkylidene urethane is merely of interest for the complete conversion of the olefine used. Preferably, there come into consideration ratios of the components which correspond to 1 to 10 equivalents of olefine per mol of alkylidene urethane grouping.

The proportions during the reaction of the diene component with the alkylidene-urethanes, optionally formed as intermediates, can also vary within wide limits. In the case of the use of equimolar amounts of alkylidene-urethane and of diene component also this may produce 1:1 adducts, but by use of an excess of the diene component it also gives adducts with higher proportions of diene component, whereas the use of excess of the alkylidene-urethane also here is merely of interest for the complete conversion of the diene component employed. Preferably, proportions of the components are considered which correspond to 0.5 to 10 equivalents of the diene component per mol of the alkylidene-urethane grouping.

The amount of catalyst can also vary within wide limits, whereby an upper limit is given by economic reasons as well as, under certain circumstances, by difficulties of working up; normally, between 1 and 100 percent by weight referred to the alkylidene-urethane, are used but, the nature of the catalyst, of the reaction components, as well as the amount and nature of the solvent possibly used, play an essential part.

For carrying out the reaction of the alkylidene urethane, which can also be produced in a preceeding operation directly in anhydrous form in the presence of a catalyst to be used for the reaction or also of a weak acid, is normally first applied under the most anhydrous conditions possible, whereby the most varied, preferably non-polar solvents, such as aliphatic hydrocarbons benzene, toluene, xylene, cyclohexane and the like, can be added. After the addition of the catalyst, the olefine is then added, whereby in the case of low boiling olefines one can also work under pressure, preferably under the pressure of the actual olefine used. After the addition of the olefine, the reaction is carried out to the end, possibly at an elevated temperature, whereby, for example, for the control of the course of the reaction the alteration of the refractive index can be used. As temperatures for the addition of the olefine and the subsequent reaction period, there come into question, in general, temperatures between −40 and +180° C., whereby the reactivity of the components is of essential influence. On the other hand, the nature of the addition can also be varied in that, for example, diurethane and olefine are also added dropwise or, in less reactive cases, the catalyst can also be added dropwise to the reaction mixture, but in all cases the direct prior contact between olefine and acidic catalyst is to be avoided. The working up of the reaction product takes place in known manner in that, for example, after removal of the acidic catalyst, unreacted starting substances and by-products are washed out or removed by distillation.

In accordance with the invention, the basic components must be brought to reaction in the form of their salts, the preparation of the salts being carried out either independently of the present process or also in the course of the condensation process according to the invention in a single step by the simultaneous addiiton of one or more acidic substances during the condensation. The preparation of the alkylidene-urethanes required for the present invention and also the reaction of the alkylidene-urethanes with the olefines in the presence of acidic catalysts is carried out by a method wholly corresponding to the process as described above.

In the simplest case, use will be made during the preparaiton of the alkylidene-urethanes with the employment of basic aldehydes or during the application of these components for the reaction with the olefine of at least yet one more equivalent of the above stated acidic catalyst beyond the amount of catalyst required during the processes for the reaction of non-basic components, referred to the basic nitrogen present, and the intermediate reaction to the urethane or the condensation with the mono- and/or poly-olefine is then carried out. In principle, acids of a wide variety of character can be considered as salts forming compounds for the above mentioned basic functions, use being preferably made of those acids which can be considered as catalysts during the reaction of the alkylidene-urethanes with olefine and which are discussed above in detail.

In the case of the present process, it is, of course, certainly possible, instead of using individual definite olefines, aldehydes, carbamic acid esters or catalysts, also mixtures thereof.

According to the nature of the catalyst, the proportions used, as well as the nature of the starting compounds and the reaction conditions, there are obtained by the reaction, with high yields, low molecular or high molecular, liquid or solid condensates which in the case of the use of alkylidene diurethanes have the structure of a di- or—in the case of using diolefines, such as divinylbenzene—of a poly-urethane.

In the case of the use of conjugated diolefines, the above-given reaction scheme alters accordingly to correspond to the possibility of a 1,4-, 1,2- or 3,4-addition.

Furthermore, monourethanes can also be obtained, on the one hand, at higher temperatures, as well as, on the other hand, in the case of the use of a condensation product from less than two mol of carbamic acid ester and one mol of aldehyde. As by-products of the reaction there can be produced in minor amounts dimeric olefines, cyclic condensates from olefine and aldehyde with m-dioxan structure or also Friedel-Crafts adducts.

The addition products obtained from dienes generally represent compounds of low molecular weight and with a well-defined structure, which are formed either by a linear addition of the elements of the alkylidene-urethanes or of the condensation products from the aldehyde and the carbamic acid ester, or also by a cyclic 1,4-addition.

The following reaction scheme may illustrate the various possibilities described above:

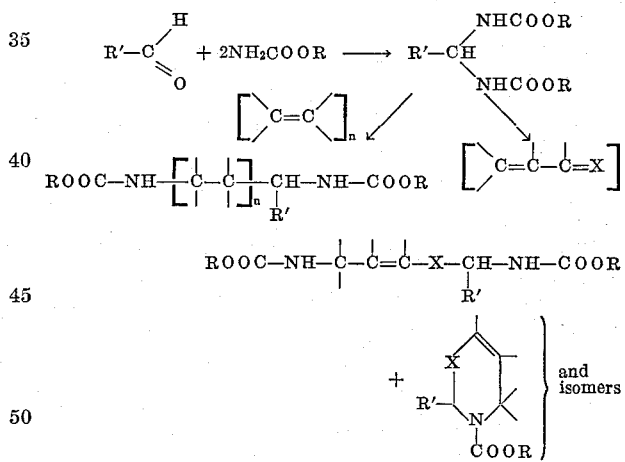

The radicals R and R' have the significance as given at the beginning of this specification, and the groupings

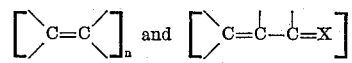

stand for the various olefines mentioned in the foregoing description, the X in the diene structure stands for another >C or for a hetero atom which in conjugation with the other olefine group is capable of reacting as a diene component, $n$ is 1–10.

The condensation products obtained according to the present invention still contain reactive groupings and can serve as intermediate products for the production of synthetic resins.

The products obtained according to the present process can also find use as lubricants, as well as plasticisers for rubber-like polymerisates based on butadiene-acrylonitrile, butadiene-styrene.

The compounds of this invention also possess insecticidal properties as it is to be seen from the following tests:
The compound of the following formula

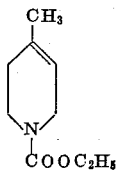

against flies (*Musca domestica*) in 0.1% aqueous emulsions shows a complete killing effect after 30 minutes. Larvae of *Aedes aegypti* are killed in the same concentration within 60 seconds. The compound has a remarkably low toxicity against warm-blooded animals of about 1 g./kg. ($LD_{50}$).

The parts given in the following examples are parts by weight if not otherwise stated. The following examples are given to illustrate the present invention, without, however, limiting it in any way.

Example 1

266 parts of benzylidenediurethan [bis(ethoxycarbonylamino)methylbenzene, $C_6H_5$-CH(NHCOOC$_2$H$_5$)$_2$] are suspended in 400 parts of absolute benzene, 100 parts of BF$_3$-etherate (boron trifluoride etherate, BF$_3$·O(C$_2$H$_5$)$_2$) are added and then 104 parts of styrene added dropwise at 80° C. in the course of 5 hours. Stirring is continued for 20 hours at 70° C., followed by shaking out with sodium bicarbonate solution and removal of liquid components in a vacuum up to 120° C./0.1 mm. Hg. As residue there are obtained 356 parts of a brown resin.

Calc. for 1,3-diphenyl-propane-1,3-diamine-N,N'-biscarbonic acid ethyl ester: 7.6% N, 17.3% O.

Found: 6.73% N, 16.26% O.

The infra-red spectrum of this compound agrees with the assumed structure; a mixture of starting material and polystyrene is excluded. Thus, the C=O double bond frequency of $5.95\mu$ for the starting urethane is shifted to $5.90\mu$; a divided NH deformation undulation of the urethane grouping in the starting urethane at 6.4 and $6.6\mu$ is found, as is to be expected, in the condensation product as a simple band at $6.5\mu$. Further characteristic bands of the starting urethane at 7.4, 7.6, 9.4, 9.65, 10.9, 11.18, 11.83 and $12.75\mu$ are completely absent; however, new bands appear at 7.5 and $9.5\mu$ which were not contained in the starting products.

Example 2

356 parts of urethane (ethyl carbamate, NH$_2$COOC$_2$H$_5$)

212 parts of benzaldehyde, 600 parts of benzene and 2 parts of BF$_3$-etherate are boiled under reflux for 8–10 hours until complete removal of the water formed. A further 20 parts of BF$_3$-etherate are then added and 208 parts of styrene are added dropwise at 80–90° C. in the course of 6 hours. The temperature is maintained for 10 hours at 90° C. and the mixture then worked up analogously to Example 1, whereby 579 parts of a yellowish resin are obtained, the infra-red spectrum of which is almost identical with the spectrum of the product obtained according to Example 1. The product shows a nitrogen content of 6.45%.

Example 3

Analogously to Example 1, 53.2 parts of benzal diurethane in 100 parts of benzene, with the addition of 40 parts of a polystyrene sulphonic acid cross-linked with 2% divinyl benzene, are condensed with 21 parts of styrene for 20 hours at 90° C., subsequently filtered off with suction, shaken out with bicarbonate solution and freed from solvent, by-products and starting material by distillation up to 140° C./0.1 mm. Hg. There are obtained 52 parts of a brown residue with 6.05% N, the infra-red spectrum of which is identical with the spectrum of the condensate obtained according to Example 1.

Example 4

266 parts of benzal diurethane with 100 parts of BF$_3$-etherate and 500 parts of absolute benzene are mixed dropwise at 60° C. (exothermic reaction) with 520 parts of styrene and then stirred for 20 hours at 60° C., whereby the refractive index $n_D^{20}$, which after the addition of the styrene shows a value of 1.5230, increases to 1.5285. The acidic catalyst is removed by shaking out with Na-bicarbonate solution and the residue is freed from liquid components up to 120° C./0.1 mm. Hg. As residue there are obtained 590 parts of a brown resin with 4.35% N and 9.84% O which corresponds to an average mol weight of about 650, i.e. the incorporation of 3.8 styrene units per mol benzal diurethane. The infra-red spectrum is qualitatively identical with the spectrum of the product obtained according to Example 1 but naturally the aromatic components preponderate in quantitative regard.

Example 5

95 parts of methylene diurethane with 100 parts of absolute benzene and 10 parts of BF$_3$-etherate are mixed at 60° C. under anhydrous conditions with 53 parts of styrene which contains 0.2% of hydroquinone for stabilization, heated for 20 hours at 70° C. and worked up analogously to Example 1. By the subsequent distillation, there is recovered some styrene, as well as about 20 parts of the methylene diurethane at 90° C./0.12 mm. Hg; by the distillation at 150° C./0.1 mm. Hg there remain 122 parts of a yellow, oily residue which shows 8.22% N.

Calc. for N,N'-bis-carbethoxy-1-phenyl-propane-1,3-diamine 9.5% N, 21.8% O. The infra-red spectrum of this condensate clearly corresponds to that of the assumed urethane and excludes a mixture of starting urethane and styrene. Characteristic bands of the methylene diurethane at 7.15, 8.9, 9.0, 10.25, 10.78 and $12.68\mu$ are again absent, while a divided NH deformatiton undulation of the urethane grouping in the starting urethane at 6.45 and $6.55\mu$ appears, as expected, as simple bands at $6.55\mu$. As new bands, there appear the frequencies of the monosubstituted benzene nucleus, as well as further bands at 7.05, 8.84 and $9.5\mu$.

Example 6

356 parts of urethane (carbamic acid ethyl ester) and 65 parts of benzene and 1 part of BF$_3$-etherate are azeotropically boiled until the water is removed and then, after the addition of a further 20 parts of BF$_3$-etherate, 208 parts of styrene added dropwise at 80–90° C. The mixture is maintained for 20 hours at 80° C. and worked up analogously to Example 1, whereby, after a distillation up to 200° C./0.1 mm. Hg, there are obtained 463 parts of a residue, the infra-red spectrum of which corresponds to the spectrum of the product obtained according to Example 5, and which contains 21.67% O and 9.08% N.

Example 7

95 parts of methylene diurethane in 100 parts of absolute benzene are mixed, in the presence of 9.5 parts of BF$_3$-etherate, with 260 parts of styrene at 70° C. in 6 hours and maintained for 2 days at 90° C., whereby the refractive index, which after the addition of the styrene shows a value of 1.5258 ($n_D^{20}$), increases to 1.5349. The acidic catalyst is then removed by washing out with alkali and liquid components distilled off up to 160° C./0.1 mm. Hg. There are obtained 267 parts of a viscous resin with 5.74% N and 12.68% O, that is an average mol weight of 500, so that about 3 mol of styrene were added to 1 mol of the methylene diurethane.

The infra-red spectrum of the condensate is qualitatively identical with the spectrum of the product obtained according to Example 5, but the frequencies of the aromatic components increase strongly.

Example 8

260 parts of benzal diurethane are azeotropically freed of water in 600 parts of benzene and then, after the addition of 20 parts of BF$_3$-etherate, mixed at 80° C. with 116 parts of α-methyl-styrene in the course of 5 hours. By subsequent heating over 20 hours at 80° C., the refractive index $n_D^{20}$ changes from 1.5085 to 1.5136. The acidic catalyst is then washed out with alkali and the product freed from liquid components up to 150° C./0.1 mm. Hg. As residue there remain 248 parts with 79.62% C, 7.05% H and 4.21% N, while for an adduct from one mol of benzal diurethane and 3.44 mol of α-methyl-styrene there is calculated an average of 78.7% C, 7.75% H and 4.16% N. The infra red spectrum agrees, in principle, with the spectrum of the condensate obtained according to Example 1, especially with regard to the functional groups.

Example 9

178 parts of urethane (carbamic acid ethyl ester), and 175 parts of 2,6-dichlorobenzaldehyde in 500 parts of benzene, with the addition of 3 parts of BF$_3$-etherate, are converted by azeotropic distillation into 2,6-dichlorobenzylidene diurethane and then, after the addition of 20 parts of BF$_3$-etherate, 104 parts of styrene added dropwise at 80–90° C. in 2 hours. The initial refractive index $n_D^{20}$ of 1.5208 alters, after 10 hours subsequent heating, to 1.5287. The acidic catalyst is subsequently removed in known manner and the liquid components—inter alia also the aldehyde—distilled off up to 200° C./0.1 mm. Hg. As yield there are obtained 377 parts of a brittle resin with 57.58% C, 5.33% H, 5.62% N and 18.3% Cl, while for a pure 1:1 adduct there is calculated 57.5% C, 5.5% H, 6.4% N and 16.1% Cl. The infra-red spectrum of the condensate agrees, with regard to the functional groups, with the spectrum of the condensate obtained according to Example 1. In addition, a division of the NH valency undulation also occurs at 2.92 and 3.02µ; the incorporated vicinal trisubstituted aromatic shows a new band at 12.9µ.

Example 10

95 parts of methylene diurethane and 200 parts of benzene are azeotropically freed of water with 1 part of BF$_3$-etherate and, after the addition of 20 parts of BF$_3$-etherate, 56 parts of isobutylene are pumped into the autoclave. The temperature is then slowly increased to 150° C., the mixture maintained for 6 hours at this temperature and then worked up in the usual manner in that the acidic catalyst is first removed and then the residue freed from liquid by-products up to 140° C./12 mm. Hg. As reaction product there is obtained a thinly viscous fluid with 60.5% C, 9.34% H, 8.92% N and an iodine number of 90, which corresponds to an adduct of 2 mol isobutylene and 1 mol of the bis-urethane.

The infra-red spectrum of the condensate clearly speaks for a mixed condensation. Thus, bands of the starting material at 8.5, 8.9, 10.8 and 12.68µ disappear; new bands appear at 7.0, 9.12 and 12.95µ, while the NH deformation band of the urethane group is shifted from 6.5 to 6.57µ.

Example 11

In an experiment analogous to Example 10, 70 parts of isoprene are used instead of the isobutylene. After analogous working up, there is obtained, I, 50 parts of a distillate with a boiling point of 108–118° C./20 mm. Hg, as well as 65 parts of residue II.

The spectra of the two condensates are almost identical and have a similarity with the spectrum of the condensation product obtained according to Example 10, in that the bands at 8.5, 8.9, 10.8 and 12.68µ again disappear, new bands appear at 7.0, 9.12 and 13.0µ and the deformation undulation at 6.55µ is shifted to longer wave lengths. In addition, the content of C–H undulations increases strongly.

The redistillation of I yields a water-clear thin fluid with a boiling point of 118° C. at 20 mm. Hg, as well as 63.4% C, 9.25% H, 8.52% N, a mol weight of 160 and an iodine number of 135.

The residue II possesses 65.75% C, 9.13% H and 8.06% N with an iodine number of 77.

Example 12

In an experiment analogous to Example 10, there are used 42 parts of propylene instead of the isobutylene and, after analogous working up to 150° C./12 mm. Hg, 64 parts of a condensate are obtained, the infra-red spectrum of which shows great similarity with the spectrum of the product obtained according to Example 10 having regard to the absence of the CH$_3$ group.

Example 13

356 parts of urethane (carbamic acid ethyl ester), 212 parts of benzaldehyde, 600 parts of benzene and 3 parts of BF$_3$-etherate are heated until the end of the azeotropic water removal by means of a water trap and subsequently, after the addition of 30 parts of SnCl$_4$, 1040 parts of styrene added dropwise in 8 hours. The mixture is heated for 30 hours at 85–90° C., then the acidic catalyst removed by washing out with bicarbonate solution and filtration and the liquid components removed by distillation up to 150° C./0.1 mm. Hg, whereby large amounts of unreacted styrene distil off. As residue there remain 683 parts of a highly viscous resin with 5.5% N, which corresponds to an adduct from about 2.4 mol of styrene and 1 mol of benzal diurethane. The infra-red-spectrum is qualitatively identical with the spectra from Examples 1 and 4.

Example 14

114 parts of heptyl aldehyde, 178 parts of urethane (carbamic acid ethyl ester), 250 parts of benzene and 2 parts of conc. sulphuric acid are boiled until the complete azeotropic removal of the water by means of a water trap, then a further 20 parts of conc. sulphuric acid added dropwise and 104 parts of styrene added dropwise at 80° C. The mixture is maintained for 30 hours at 85° C. and the liquid components removed up to 150° C./5 mm. Hg, after the sulphuric acid has been previously washed out in known manner with soda lye. As residue there remain 185 parts of condensate with 71.25% C, 9.91% H and 5.7% N, while for an adduct from 1 mol heptylidene diurethane and 2 mol styrene there is calculated 72.4% C, 8.75% H and 5.82% N.

The infra-red spectrum of the condensate agrees, with regard to the functional groups, with the spectrum of the condensation product obtained according to Example 5; as difference there appears the expected substantial increase of the proportion of aliphatic C–H bonds.

Example 15

136 parts of anisaldehyde, 100 parts of a polystyrene sulphonic acid according to Example 3 and 178 parts of urethane (carbamic acid ethyl ester) are first freed from formed water in 400 ml. of cyclohexane by means of azeotropic distillation and then 104 parts of styrene added dropwise at 80–90° C. After subsequently heating for 25 hours at 85° C., the acidic catalyst is filtered off, shaken several times with bicarbonate solution and the liquid components removed up to 160° C./0.1 mm. Hg, whereby 160 parts of a resinous residue with 22.0% O and 5.8% N are obtained.

The infra-red spectrum of the new compound is, with regard to the functional groups, identical with the condensate obtained according to Example 1. The p-substituted aromatic residue clearly appears at 12.0µ.

Example 16

151 parts of p-nitrobenzaldehyde, 178 parts of urethane and 300 parts of benzene, with 3 parts of BF$_3$-etherate, are boiled until the azeotropic removal of the water, then a further 20 parts of BF$_3$-etherate are added and 104 parts of styrene added dropwise at 80–90° C. in the course of 3 hours. After 2 days at 85° C.; the acidic catalyst is removed in the usual way, whereby, at the same time, a crude substance melting at 187–188° C. crystallizes out which, according to the infra-red spectrum, is the p-nitrobenzylidene-bis-urethane. The residue is subsequently freed by distillation from starting material and by-products up to 180° C. and 0.2 mm. Hg and 309 parts of a solidifiable resin are obtained which shows 64.2% C, 6.1% H, 20.95% O and 9.3% N, which corresponds to the addition of an average of 1.3 mol styrene to 1 mol p-nitrobenzylidene-bis-urethane. The infra-red spectrum clearly speaks for a co-polymerisation since, having regard to a p-substituted aromatic, it compares with the spectrum of the condensate obtained according to Example 1.

Example 17

240 parts of p-tolyl aldehyde and 300 parts of carbamic acid methyl ester in 500 parts of benzene with 2 parts of BF$_3$-etherate are converted into the bisurethane, after removal of the water by azeotropic distillation, 40 parts of BF$_3$-etherate are added and 208 parts of styrene added dropwise while boiling under reflux. The mixture is maintained for 20 hours at about 90° C., the catalyst then removed in the usual way and as residue 549 parts with 70.4% C, 6.9% H and 7.1% N are obtained.

The infra-red spectrum of the condensate compares, in principle, with the spectrum of the condensation product obtained according to Example 1, having regard to the incorporation of a p-methyl-substituted aromatic.

Example 18

132 parts of cinnamyl aldehyde, 178 parts of urethane and 250 parts of benzene are boiled with 100 parts of polystyrene sulphonic acid according to Example 3 until the azetropic removal of the water and then 104 parts of styrene are added dropwise while boiling under reflux. After 20 hours at 85° C., the catalyst is removed by filtration and the filtrate freed from liquid components up to 180° C./0.1 mm. Hg. 208 parts of a solidifiable resin with 71.1% C., 6.8% H and 6.5% N are obtained, while for a 1:1 adduct there is calculated 69.7% C, 7.1% H and 7.1% N. The infra-red spectrum of the compound is, with regard to the functional groups, comparable to the spectrum of the condensate obtained according to Example 1.

Example 19

Analogous to Example 11, 89 parts of urethane in 250 parts of benzene are first condensed with 30 parts of paraformaldehyde with the addition of 2 parts of BF$_3$-etherate and then, after the addition of a further 20 parts of BF$_3$-etherate, 70 parts of isoprene are pumped under pressure into the autoclave and the mixture heated for 6 hours at 150° C. After analogous working up, there are obtained 59 parts of the distillate described in Example 11 under I and 85 parts of a residue undistillable up to 200° C./0.1 mm. Hg, which is practically identical with the condensate described in Example 11 under II.

Example 20

133 parts of benzal diurethane, 200 parts of adsorbed benzene and 20 parts of BF$_3$-etherate are treated in the autoclave at 80° C. with 40 parts of isoprene by pumping in and heated for 4 hours at 150° C. The product is subsequently freed from the acidic catalyst by treatment with sodium bircarbonate solution and the organic phase then subjected to the distillation. There are obtained first 80 parts of 120–160° C./0.3 mm. Hg which yields 2-phenyl-4 - methyl - 1 - carbethoxy - 1,2,3,6 - tetrahydropyridine. $n_D^{20}$=1.5321.

Calc. C$_{15}$H$_{19}$N$_2$: 73.5% C, 7.8% H, 5.7% N.
Found: 73.2% C, 8.0% H, 0.6% N.

Example 21

178 parts of carbamic acid ethyl ester and 35 parts of paraformaldehyde are, with the use of 150 parts of benzene and 1 part of BF$_3$-etherate, converted analogously to Example 2 into the bisurethane, then 20 parts of BF$_3$-etherate and 1 part of tert.-butyl-pyrocatechol are added and 82 parts of 2,3-dimethyl-butadiene pumped into the autoclave at 150° C. The mixture is maintained for 4 hours at 150° C., after cooling adjusted to a pH of 7–8 by the addition of alkali lye and the organic phase shaken out several times with water. By distillation of the benzene phase there are obtained a total of 96 parts of the crude 3,4-dimethyl - 1 - carbethoxy - 1,2,5,6 - tetrahydropyridine with a boiling point of 133–135° C./20 mm. Hg and a refractive index $n_D^{20}$=1.4795.

Calc. C$_{10}$H$_{17}$NO$_2$: 65.5% C, 9.4% H, 7.6% N.
Found: 65.3% C, 9.5% H, 7.8% N.

Example 22

45 parts of chloroprene are pumped to 95 parts of methylene bisurethane with 100 parts of benzene and 20 parts of BF$_3$-etherate in the autoclave at room temperature. The mixture is then heated in the course of 3 hours at 150° C. and maintained at this temperature for 4 hours. After cooling, the acidic catalyst is removed by repeated washing with dilute bicarbonate solution and the organic phase subjected to distillation, whereby the crude 4-chloro-1-carbethoxy-1,2,5,6-tetrahydro-pyridine is obtained with a boiling point of 138–140° C./18 mm. Hg and a refractive index of $n_D^{20}$=1.4882 in an amount of 44 parts.

Calc. C$_8$H$_{12}$ClNO$_2$; 50.7% C, 6.4% H; 7.4% N, 18.7% Cl.
Found: 50.1% C, 6.4%; 7.7% N, 12.7% Cl.

Example 23

50 parts of concentrated sulphuric acid are added dropwise to a mixture of 54 parts of pyridine-2-aldehyde, 89 parts of carbamic acid ethyl ester, and 250 parts of benzene, and the mixture is freed azeotropically from the resultant water, with use of a water trap, until separation of water has been completed. Another 15 parts of concentrate sulphuric acid are then added dropwise at 80–90° C., and thereafter 52 parts of styrene during 2 hours, and stirring at 90–120° C. is continued for another 20 hours. On neutralisation of the acid (pH=7–8), 50 parts of white crystals are obtained as by-product which melt at 147–149° C. after recrystallisation from toluene and constituting the separately produced pyridine-2-aldehyde-bis-urethane.

Calc.: 53.9% C, 6.4% H, 15.7% N.
Found: 53.7% C, 6.3% H, 15.5% N.

The condensation product of pyridine-2-aldehydebis-urethane with styrene, obtained in the form of an oily substance, is taken up in or extracted with benzene, and thereafter freed from solvents, volatile components, etc. at up to 160% C./0.1 mm. Hg, when 70 parts of the brown condensate are obtained. In comparison with the spectrum of the above described pyridine-2-aldehyde-bis-urethane, the infrared spectrum of this condensation product exhibits an extensive equalisation of the resolution at 6.45 and 6.65$\mu$ to give a wide band at 6.5$\mu$, and similarly at 7.9 and 8.15$\mu$ to a wide band at 8.0$\mu$. The band at 9.4$\mu$ shifts to 9.65$\mu$, in the expected direction. In addition, the vibration bands of the monosubstituted benzene nucleus occur besides those due to the pyridine nucleus.

Example 24

50 parts of p-dimethylamino-benzaldehyde, 60 parts of carbamic acid ethyl ester, 160 parts of benzene, and 40 parts of concentrated sulphuric acid are converted to the bis-urethane by analogy to the method of the process in Example 1, and this is condensed with 35 parts of styrene after addition of 10 parts of boron trifluoride-etherate by analogy with Example 23. After working up, again according to Example 23, 104 parts of a brown resin are obtained as the residue, having 74.5% C., 7.7% H, and 8.3% N, whilst 66.7% C., 7.5% H, and 10.2% N are calculated for a 1:1 adduct. The infrared spectrum of this condensate exhibits the usual expected bands for the functional groups, e.g. the NH— band at $3.0\mu$, the CO— band at $5.85\mu$, the CO—NH band at $6.6\mu$, and also the band of the p-disubstituted aromatic nucleus at $12.3\mu$ and the band of the monosubstituted aromatic nucleus at 13.35 and $14.35\mu$; in addition further intensive bands at 7.4, 8.1, and $9.45\mu$. With the exception of the band for the benzene nucleus disubstituted in the p-position, the spectrum corresponds to the spectrum for the condensation product from benzaldehyde, styrene, and carbamic acid ethyl ester as obtained according to the process of Example 23 in the main patent.

*Example 25*

177 parts of p-diethylamino-benzaldehyde, 178 parts of carbamic acid ethyl ester and 800 parts of benzene are carefully treated with 100 parts of concentrated sulphuric acid, and the resultant water is removed by means of azeotropic distillation with use of a water trap. Then 30 parts of concentrated sulphuric acid are first added dropwise at 80° C., and then 104 parts of styrene in the course of 3 hours, the mixture heated under reflux at 80–90° C., for 20 hours, adjusted to a pH value of 7–8 with dilute sodium hydroxide solution, and the benzene phase containing the condensation product is separated. Solvents, by-products, and unconverted starting materials are removed by distillation up to 160° C/0.1 mm. Hg, and 315 parts of a brown resin are obtained as the residue, containing 73.8% C., 7.7% H, and 7.9% N, whilst 68.1% C., 8.0% H, and 9.5% N are calculated for a 1:1 adduct. The infrared spectrum of the compound is identical with the spectrum of the product obtained according to Example 24 with regard to the functional groups and also to the substitution of the benzene nuclei. Minor differences are observed owing to the presence of the diethylamino group in place of the dimethylamino group in the structure range of $7.0–11.0\mu$.

*Example 26*

95 parts of methylene-diurethane in 200 parts of absolute benzene are treated with 20 parts of boron trifluoride-etherate and 50 parts of 1,2-dimethylenecyclohexane

[CH₂—(CH₂)₃—C(=CH₂)—C(=CH₁)]

are then added at a temperature of 80° C. The reaction mixture is maintained at 80° C. for 4 hours, and then refluxed for another 10 hours. The acidic catalyst as well as the carbamic acid ethyl ester split off during the reaction are washed out by repeatedly rinsing with sodium bicarbonate solution and thereafter with water, and the product is distilled. 53 parts of a colourless compound having a refractive index of $n_D^{20}=1.4995$ distil at 96° C./ 0.1 mm. of Hg, and in accordance with analysis, infrared, and nuclear resonance spectrum is N-ethoxycarbonyl-1, 2,3,4,5,6,7,8-octahydroisoquinoline having the formula:

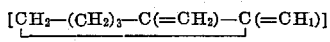

*Example 27*

53 parts of benzaldehyde, 89 parts of carbamic acid ethyl ester, 250 parts of benzene, and 1 parts of sulphuric acid are boiled under reflux with the aid of a water trap in order to separate the water which is formed. When separation of water has been completed, 20 parts more of BF₃-etherate are added, and 54 parts of 1,2-dimethylene-cyclohexane are introduced dropwise at 80° C. Further processing and working up is carried out by analogy with Example 26. The reaction product is obtained in a yield of 55 parts with a boiling point of 147–150° C./0.07 mm. of Hg and a refractive index of $n_D^{20}=1.5442$. In accordance with analysis and also with the spectra, it is 3-phenyl-2-carbethoxy - 1,2,3,4,5,6,7,8 - octahydro-isoquinoline.

*Example 28*

By analogy with Example 26, 35 parts of methylene-diurethane in 100 parts of absolute benzene are first treated with 10 parts of BF₃-etherate, and then, at 70° C., with 25 parts of bi-1-cyclohexen-1-yl. The mixture is maintained at 70° C. for 4 hours, and then refluxed for another 10 hours. Working up is also carried out by analogy with Example 26. As reaction product, there are obtained 32 parts of a viscous, colourless oil which boils at 126–128° C./0.05 mm. Hg, exhibits a refractive index of $n_D^{20}=1.5191$, and according to its properties is identical with N - ethoxycarbonyl - 1,2,3,4,5,6,7,8,9,10,11,14-dodecahydrophenanthridine having the formula:

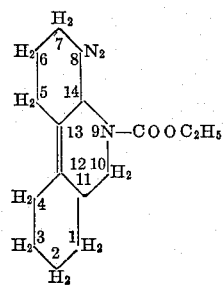

*Example 29*

178 parts of carbamic acid ethyl ester, 35 parts of para-formaldehyde, 500 parts of absolute benzene, and 1 part of BF₃-etherate are boiled under reflux with use of a water trap until separation of water has been completed, by analogy with Example 27. A further 20 parts of BF₃-etherate are then added, and a total of 180 parts of anthracene is added in portions at a temperature of 70° C. during about 6 hours. Subsequently, the entire product is maintained at 80° C. for another 4 hours, and further 10 hours under reflux conditions, when a bright yellow precipitate is formed. After the precipitate is filtered off with suction and recrystallised from glycol-monomethyl ether-acetate, 180 parts of yellow crystals are obtained altogether, which according to analysis and spectrum are identical with the isomers of N,N'-carbethoxy-9-amino-10-aminoethyl-9,10-dihydro-anthracene. The mixture can be separated into two isomers of M.P. 290–292° C. and 117° C. by fractional crystallisation.

*Example 30*

By analogy with Example 27, 53 parts of benzaldehyde and 89 parts of carbamic acid ethyl ester in 250 parts of benzene are first converted into the benzal-bis-urethane with 1 part of BF-etherate. Another 20 parts of BF₃-etherate are then added, and 28 parts of acrolein are introduced dropwise at 70° C. The mixture is maintained at 70° C. for 4 hours, then 12 hours at 90° C., and it is worked up according to the method described in Example 26, an alkaline value of pH being provided during the first stage of washing by the addition of a small amount of alkali. The resultant condensation product can not be distilled, but its infrared spectra do not exhibit any bands due to an alkylidene-bis-urethane. The vibrations due to the normal urethane grouping=N—COOR and also due to the monosubstituted aromatic compound are observed, by analogy with the spectra previously obtained.

*Example 31*

25 parts of methylene-diurethane, 10 parts of BF₃-etherate, and 100 parts of absolute benzene are treated at 60° C. with 15 parts of 1-isopropenyl-cyclohexene (during 3 hours). After 4 hours at 80° C. and 10 hours under reflux, the resultant product is worked up according to the method described in Example 26, and finally subjected to distillation. This produces, at 92–96° C./0.05 mm. Hg, a colourless distillate with a refractive index of $n_D^{20}=$ 1.5023, the spectrum and analysis of which agree with the accepted structure for N-ethoxycarbonyl-4-methyl-1,2,3,5,6,7,8,9-octahydroisoquinoline having the formula:

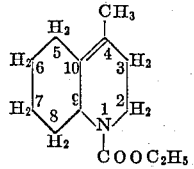

Example 32

40 parts of benzal-diurethane, 10 parts of BF₃-etherate, and 12 parts of 1-isopronepyl-cyclohexene in 150 parts of benzene are reacted by the method described in Example 31, and 5.5 parts of a thickly viscous oil are obtained as the reaction product at about 120° C./0.05 mm. Hg, for which must be assumed, by virtue of spectra and analyses, the structure of a 2-(1)-phenyl-N-carbethoxy-4-methyl-1,2,3,5,6,7,8,9-octahydro-(iso)-quinoline. $n_D^{20}=1.5212$.

Example 33

1 mol of the corresponding aldehyde of one of the formulae as mentioned below together with 178 parts of carbamic acid ethyl ester and 2 parts of BF₃-etherate are reacted with 350 parts of benzene in a reflux condenser, until dehydration is finished. The reaction mixture is cooled to 70° C. and there are added 25 parts of BF₃-etherate. At 80° C. there are added dropwise 75 parts of isoprene during about 6 hours. The reaction is finished under reflux conditions during 10 hours. The benzenic solution is washed neutral after cooling with water, the product is isolated by distillation. Yield: about 40 to 75% of the theoretical.

The condensation products correspond to the Formulae A and B and are obtained as follows:

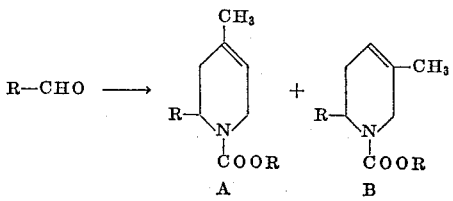

The infrared spectrums and analytical data correspond to the formulae given in the table below.

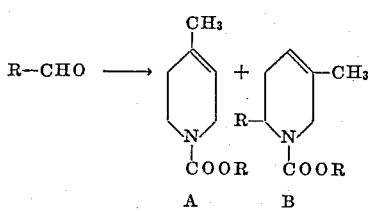

| | B.P. | $n_D^{20}$ |
|---|---|---|
| CH₃–⌬– | 143°/0.08 Torr | 1.5304 |
| Cl–⌬– | 156–160°/0.1 Torr | 1.5417 |
| Cl–⌬(Cl)– | 152–160°/0.08 Torr | 1.5489 |
| (Cl)⌬–Cl | 148–165°/0.08 Torr | 1.5462 |
| ⌬–OCH₃ | 155–160°/0.1 Torr | 1.5359 |
| ⌬–OCOCH₃ | 170–175°/0.3 Torr | 1.5300 |
| ⌬–Cl | 148–150°/0.3 Torr | 1.5414 |
| Cl–CH₂–CH₂–CH₂– | 93–105°/0.1 Torr | 1.4805 |
| (CH₃)₂CH– | 72–76°/0.1 Torr | [1] 1.4695 |
| CH₃O–⌬(HO)– | 192°/0.1 Torr | 1.5434 |
| ⌬–CO– | 155–165°/0.1 Torr | 1.5343 |
| NC–CH₂–CH₂–C(CH₃)₂– | 140–140°/0.1 Torr | 1.4815 |
| ⌬–NO₂ | Resinous | |
| O₂N–⌬– | do | |

[1] $n_D^{25}$.

Example 34

A mixture of 190 parts of methylene diurethane, 20 parts of BF₃-etherate, 0.5 part of tertiary butylpyrocatechol and 300 parts of benzene is reacted with 100 parts of butadiene at a temperature of 60° C. during 10 hours. Butadiene is taken up only in small amounts. After agitation with H₂O and distillation there is obtained the N-carbethoxy-1,2,5,6-tetrahydro-pyridine at a temperature of 93° C./12 Torr; $n_D^{20}=1.4728$.

Example 35

A mixture of 95 parts of methylen-bisurethane and 200 parts of benzene is treated with 20 parts of BF₃-etherate and to this mixture there are added dropwise at 80° C. 56 parts of endomethylene-1,2-dimethylene-cyclohexane. The temperature is kept at 80° C. for 4 hours and the reaction is finished under reflux conditions during 10 hours. It is then agitated with H₂O and distilled off. The adduct, the 2-carbethoxy-5,6-endomethylene-1,2,3,4,5,6,7,8-octa-

17 hydro-isoquinoline, distills at 118–119°/0.08 Torr; $n_D^{20}$=1.5195.

Example 36

In an analogous manner as described in Example 11 instead of 95 parts of methylene-diurethane there is used methylen-bis-carbamic acid-isopropyl ester, obtained by mixture of 15 parts of 100% paraformaldehyde and 101 parts of carbamic acid-isopropylester with 2 parts of BF$_3$-etherate in 200 parts of benzene azetropical distillation of water. There is obtained the N-carbo-isopropoxy-4-methyl-1,2,5,6-tetrahydropyridine of B.P. 110–111° C./12 Torr, $n_D^{20}$=1.4660.

Example 37

In an analogous manner as described in the table above Example 34 is modified by the use of equimolecular amounts of carbamic acid-isopropylester and thereby there is obtained the N,N' - bis-carbisopropoxy-1,3-diamino-diphenyl-propane (resinous). The structure is secured when compared with Example 34.

Example 38

90 parts of methylene-diurethane and 160 parts of benzene are treated with 30 parts of BF$_3$-etherate and to this mixture there are added during 4 hours and at 80° C. 70 parts of sorbinic acid ethyl ester. The temperature is kept at 80° C. for 4 hours and furthermore for 15 hours at reflux temperature, it is then washed with H$_2$O and distilled off. There are obtained 27 parts of sorbinic acid ethyl ester as well as methylene diurethane. As reaction product there are obtained (a) 43 parts of the cyclic product of piperidine structure: B.P. 128–129° C./0.07 Torr, $n_D^{20}$=1.4710.

Calculated: C, 59.7%; H, 7.9%; N, 5.8%.
Found: C, 59.2%; H, 8.0%; N, 6.5%.

This product according to the infrared spectrum only contains small portions of methylene-diurethane; and (b) there are obtained 22 parts of a higher distilling adduct of B.P. 181–190° C./0.1–0.2 Torr; $n_D^{20}$=1.4780.

Calculated: C 54.6%, H 7.9%, N 8.5%.
Found: C 55.4%, H 6.0%, N 8.6%.

Example 39

70 parts of methylen-bis-urethane, 250 parts of benzene and 10 parts of BF$_3$-etherate are added dropwise at 60° C. to 54 parts of 1-phenyl-butadiene. The reaction mixture is kept at a temperature of 80° C. for 4 hours and under reflux conditions for 10 hours. It is then washed neutral with H$_2$O and distilled off. There is obtained the N-carbethoxy-2-phenyl-1,2,5,6 - tetrahydro - pyridine of B.P. 110–112° C./0.08 Torr; $n_D^{20}$=1.5361 in a yield of 45%.

Example 40

A mixture of 10 parts of paraformaldehyde, 54 parts of carbamic acid ethyl ester, 100 parts of benzene and 0.5 part of BF$_3$-etherate is boiled under removal of water. It is then treated with 15 parts of BF$_3$-etherate at a temperature of 80° C. To this solution there are added dropwise 60 parts of benzene. The temperature is kept at 80° C. for 15 hours and then the mixture is washed neutral. There are obtained after concentration to 120° C./12 Torr 122 parts of the reaction product, the ultra-red spectrum of which corresponds to the adopted structure.

Calculated: N 3.3%.
Found: N 2.9%.

I claim:

1. A process for the production of an O-alkyl ester of an N-alkylcarbamic acid which comprises reacting in an inert hydrocarbon medium
   (a) an aldehyde of the group consisting of aliphatic, carbocyclic araliphatic and heterocyclic monoaldehydes,
   (b) an O-alkyl ester of carbamic acid, and
   (c) an unsaturated compound of the group consisting of alpha olefins, conjugated diolefins, and vinyl aromatic compounds, in the presence of a Lewis acid catalyst at a temperature between about 20° and about 180° C., and recovering the resulting O-alkyl ester of the N-alkylcarbamic acid.

2. A process as defined in claim 1 in which the Lewis acid catalyst is boron trifluoride.
3. A process as defined in claim 1 in which the aldehyde is p-nitrobenzaldehyde.
4. A process as defined in claim 1 in which the aldehyde is 2-chlorobenzaldehyde.
5. A process as defined in claim 1 in which the aldehyde is 3,4-dichlorobenzaldehyde.
6. A process as defined in claim 1 in which the aldehyde is 4-methylbenzaldehyde.
7. A process as defined in claim 1 in which the aldehyde is 2-acetoxybenzaldehyde.
8. A process as defined in claim 1 in which the aldehyde is phenylglyoxal.
9. A process as defined in claim 1 in which the O-alkyl ester of carbamic acid is urethan.
10. A process as defined in claim 1 in which the unsaturated compound is 2,3-dimethyl-1,3-butadiene.
11. A process as defined in claim 1 in which the unsaturated compound is 1-phenyl-1,3-butadiene.
12. A process as defined in claim 1 in which the unsaturated compound is chloroprene.
13. A process as defined in claim 1 in which the unsaturated compound is 1,2-dimethylenecyclohexane.
14. A process as defined in claim 1 in which the unsaturated compound is bi-1-cyclohexen-1-yl.
15. A process as defined in claim 1 in which the unsaturated compound is ethyl sorbate.
16. A process for the production of an O-alkyl ester of an N-alkylcarbamic acid which comprises reacting in an inert hydrocarbon medium in a first step
   (a) an aldehyde of the group consisting of aliphatic carbocyclic, araliphatic, and heterocyclic monoaldehyde, with
   (b) an O-alkyl ester of carbamic acid, separating the product of the said reaction of the aldehyde and the O-alkyl ester of carbamic acid and reacting it in a second step with
   (c) an unsaturated compound of the group consisting of alpha olefins, conjugated diolefins, and vinyl aromatic compounds, in the presence of a Lewis acid catalyst at a temperature between about 20° C. and about 180° C. and recovering the resulting O-alkyl ester of the N-alkylcarbamic acid.

17. A process for the production of an O-alkyl ester of an N-alkylcarbamic acid which comprises reacting in an inert hydrocarbon medium in a first step
   (a) 1 molecular proportion of an aldehyde of the group consisting of aliphatic, carbocyclic, araliphatic and heterocyclic monoaldehydes with
   (b) 2 molecular proportions of an O-alkyl ester of carbamic acid, separating the resulting O-alkyl ester of the alkylene biscarbamic acid from the reaction mixture and reacting it in a second step with
   (c) an unsaturated compound of the group consisting of alpha olefins, conjugated diolefins, and vinyl aromatic compounds, in the presence of a Lewis acid catalyst at a temperature between about 20° and about 180° C. and recovering the resulting O-alkyl ester of the N-alkylcarbamic acid.

18. A process as defined in claim 17 in which the O-alkyl ester of the alkylene biscarbamic acid is ethyl benzalbiscarbamate.
19. A process as defined in claim 17 in which the O-alkyl ester of the alkylene discarbamic acid is ethyl methylene biscarbamate.
20. A process for the production of an O-alkyl ester of an N-alkylcarbamic acid which comprises reacting in an inert hydrocarbon medium
   (a) an aldehyde of the group consisting of aliphatic, carbocyclic, araliphatic and heterocyclic monoaldehydes,
(b) an O-alkyl ester of carbamic acid, and
(c) an unsaturated compound of the group consisting of alpha olefins, conjugated diolefins, and vinyl aromatic compounds, in the presence of tin tetrachloride at a temperature between about 20° and about 180° C., and recovering the resulting O-alkyl ester of the N-alkylcarbamic acid.

21. A process for the production of an O-alkyl ester of an N-alkylcarbamic acid which comprises reacting in an inert hydrocarbon medium
(a) an aldehyde of the group consisting of aliphatic, carbocyclic, araliphatic and heterocyclic monoaldehydes,
(b) an O-alkyl ester of carbamic acid, and
(c) an unsaturated compound of the group consisting of alpha olefins, conjugated diolefins, and vinyl aromatic compounds, in the presence of boron trifluoride etherate at a temperature between about 20° and about 180° C., and recovering the resulting O-alkyl ester of the N-alkylcarbamic acid.

22. A process for the production of an O-alkyl ester of an N-alkylcarbamic acid which comprises reacting in an inert hydrocarbon medium
(a) an aldehyde of the group consisting of aliphatic, carbocyclic, araliphatic and heterocyclic monoaldehydes,
(b) an O-alkyl ester of carbamic acid, and
(c) an unsaturated compound of the group consisting of alpha olefins, conjugated diolefins, and vinyl aromatic compounds in the presence of sulfonated polystyrene at a temperature between about 20° and about 180° C., and recovering the resulting O-alkyl ester of the N-alkylcarbamic acid.

23. A process for the production of an O-alkyl ester of an N-alkylcarbamic acid which comprises reacting in an inert hydrocarbon medium
(a) formaldehyde,
(b) an O-alkyl ester of carbamic acid, and
(c) an unsaturated compound of the group consisting of alpha olefins, conjugated diolefins, and vinyl aromatic compounds, in the presence of a Lewis acid catalyst at a temperature between about 20° and about 180° C., and recovering the resulting O-alkyl ester of the N-alkylcarbamic acid.

24. A process for the production of an O-alkyl ester of an N-alkylcarbamic acid which comprises reacting in an inert hydrocarbon medium
(a) benzaldehyde,
(b) an O-alkyl ester of carbamic acid, and
(c) an unsaturated compound of the group consisting of alpha olefins, conjugated diolefins, and vinyl aromatic compounds, in the presence of a Lewis acid catalyst at a temperature between about 20° and about 180° C., and recovering the resulting O-alkyl ester of the N-alkylcarbamic acid.

25. A process for the production of an O-alkyl ester of an N-alkylcarbamic acid which comprises reacting in an inert hydrocarbon medium
(a) paraformaldehyde,
(b) an O-alkyl ester of carbamic acid, and
(c) an unsaturated compound of the group consisting of alpha olefins, conjugated diolefins, and vinyl aromatic compounds in the presence of a Lewis acid catalyst at a temperature between about 20° and about 180° C., and recovering the resulting O-alkyl ester of the N-alkylcarbamic acid.

26. A process for the production of an O-alkyl ester of an N-alkylcarbamic acid which comprises reacting in an inert hydrocarbon medium
(a) an aldehyde of the group consisting of aliphatic, carbocyclic, araliphatic and heterocyclic monoaldehydes,
(b) an O-alkyl ester of carbamic acid, and
(c) styrene, in the presence of a Lewis acid catalyst at a temperature between about 20° and about 180° C., and recovering the resulting O-alkyl ester of the N-alkylcarbamic acid.

27. A process for the production of an O-alkyl ester of an N-alkylcarbamic acid which comprises reacting in an inert hydrocarbon medium
(a) an aldehyde of the group consisting of aliphatic, carbocyclic, araliphatic and heterocyclic monoaldehydes,
(b) an O-alkyl ester of carbamic acid, and
(c) isoprene, in the presence of a Lewis acid catalyst at a temperature between about 20° and about 180° C., and recovering the resulting O-alkyl ester of the N-alkylcarbamic acid.

28. N,N'-bis(ethoxycarbonyl) - 1,3 - diphenyl - 1,3-diamino-propane.

References Cited by the Examiner
UNITED STATES PATENTS

| | | | |
|---|---|---|---|
| 2,929,813 | 3/1960 | Janssen | 260—295 |
| 2,937,180 | 5/1960 | Janssen | 260—294 |
| 2,957,880 | 10/1960 | Rometsch | 260—294 |
| 2,967,182 | 1/1961 | Pohland | 260—295 |
| 3,016,381 | 1/1962 | Cohen et al. | 260—287 |
| 3,030,362 | 4/1962 | England | 260—244 |
| 3,037,989 | 6/1962 | Biel | 260—287 |
| 3,047,573 | 7/1962 | Takahashi et al. | 260—244 |
| 3,048,619 | 8/1962 | Pray | 260—471 |
| 3,048,620 | 8/1962 | Spivack | 260—471 |
| 3,051,744 | 8/1962 | Bowers | 260—482 |
| 3,056,828 | 10/1962 | Parker et al. | 260—482 |

LORRAINE A. WEINBERGER, *Primary Examiner.*

IRVING MARCUS, D. D. HORWITZ, *Examiners.*

R. T. BOND, L. A. THAXTON, *Assistant Examiners.*